May 15, 1956 P. J. PILGER 2,745,227
PROPULSION HEAD FOR GLASS GRINDING MACHINES
Filed Sept. 10, 1953
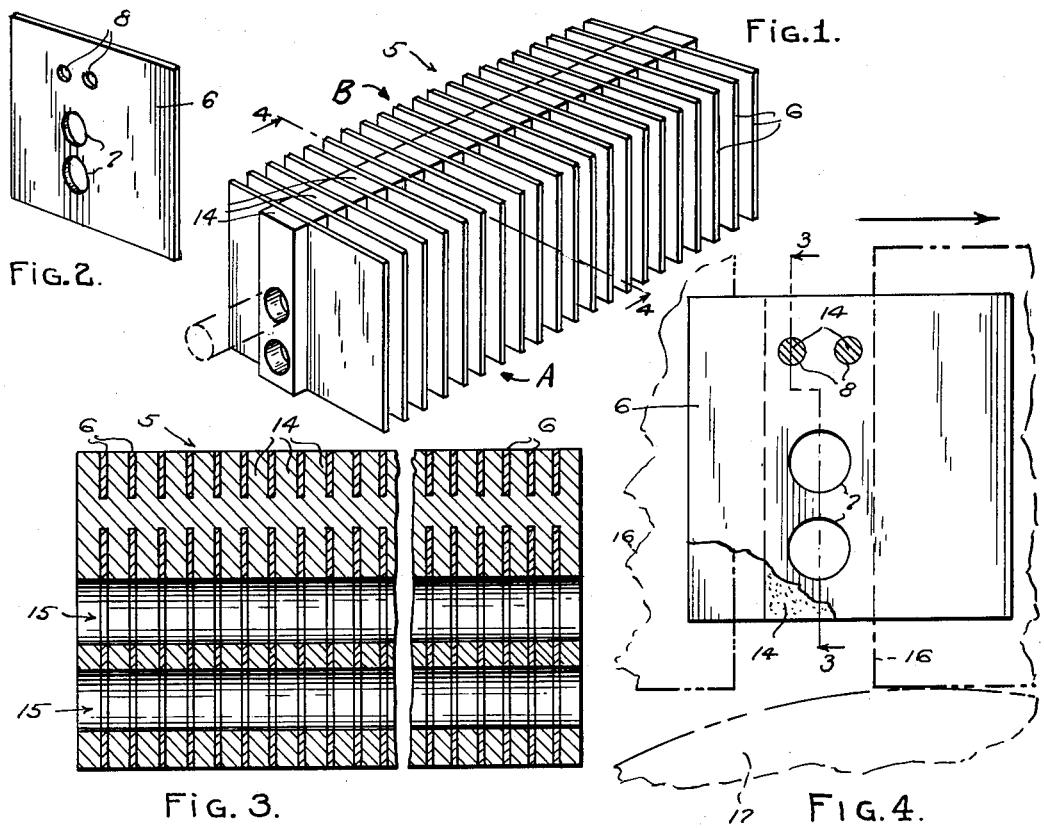
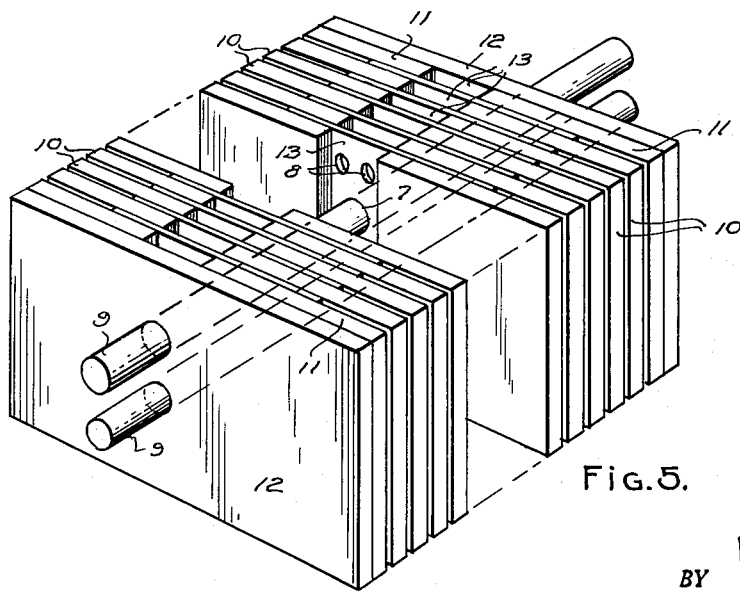
INVENTOR.
PAUL J. PILGER,
BY
ATTORNEY.

United States Patent Office 2,745,227
Patented May 15, 1956

2,745,227
PROPULSION HEAD FOR GLASS GRINDING MACHINES

Paul J. Pilger, North Miami, Fla.

Application September 10, 1953, Serial No. 379,322

5 Claims. (Cl. 51—216)

This invention relates to improvements in propulsion heads for use with glass grinding machines and has particular reference to a novel form of propulsion head employed to propel a plurality of sheets of glass in spaced apart relation through the machine in edgewise manner for simultaneously grinding the longitudinal edges of the sheets.

The invention embodies a novel form of propulsion head and a novel method of manufacture thereof.

Propulsion heads are well known broadly in glass grinding machines where they simultaneously support a plurality of spaced apart and parallel sheets of glass in edgewise manner to push or propel them over one or more grinding wheels and with the head comprising a plurality of parallel guide plates that are connected with a conveyor device. Cost of manufacture of such heads has been considerable and the method of this applicant results in a very novel form of head and a very novel form of manufacture thereof that results in a considerable saving in cost.

The method of the present invention permits the assembly of a plurality of guide plates with a plurality of filler blocks that are all arranged in assembled relation and securely clamped together with the several guide plates being subsequently bonded together in a novel manner after which the filler blocks are removed.

The invention will be more clearly described during the course of the following description, reference being made to the accompanying drawings wherein has been illustrated both the article and the method of forming and wherein like characters of reference are employed to denote like parts throughout.

In the drawings:

Figure 1 is a perspective view of a complete propulsion head constructed in accordance with the invention, Figure 2 is a perspective view of one guide plate that is constructed in accordance with the invention, Figure 3 is a longitudinal section of the complete head as shown in Figure 1 and taken on line 3—3 of Figure 4, Figure 4 is a transverse section, taken on line 4—4 of Figure 1, and Figure 5 is a perspective view illustrating the method of assembling and bonding together the several guide plates.

Referring specifically to the drawings, the numeral 5 indicates a complete propulsion head that is supported and connected to a conventional conveyor carriage, through the medium of which the head is conducted in a horizontal path through the machine to propel a plurality of sheets of glass in spaced apart relation and in edgewise manner over one or more conventional grinding wheels.

The propulsion head embodies a plurality of identical and preferably non-metallic guide plates 6, generally square or rectangular and with the several plates arranged in identically spaced and parallel relation. Each of the plates 6, see particularly Figure 2, is provided with a pair of relatively large and identical cylindrical openings 7 and a pair of smaller openings 8. The several openings 7 and 8 are arranged to one side of the vertical center line of the plates, as clearly shown in Figure 4, for a purpose to be presently described.

It is essential in a device of this type that the several plates be fixedly arranged in accurate alignment with each other and with their several openings being axially aligned and with the whole assembly being rigidly bonded together against shifting and to facilitate the engagement of carrier rods that connect and support the propulsion head to a conveyor. To facilitate the assembly of the propulsion head at a minimum cost, the several plates 6 are simultaneously engaged with a pair of cylindrical rods 9, shown in full lines in Figure 5. The plates 6 as now supported upon the rods 9 in proper alignment with each other are placed in a suitable jig, not shown, with their bottom edges supported on a flat surface. It should be here stated that the rods 9 have a snug fit in the several openings 7. The plates 6 being supported upon a flat surface are next shifted apart. Metallic filler blocks 10, having a thickness corresponding to the desired spacing of the plates 6 are then arranged in between the plates 6, with the blocks 10 projecting inwardly from the vertical edges of the plates 6 from opposite sides to terminate at an identical point throughout the length of the head and with the point of termination being outwardly of the openings 8. Outer blocks 11, identical to the blocks 10, are positioned against the outer faces of the end plates 6 and final covers 12 completely overlie the plates 11. The several plates 6 and the blocks and cover plates 10, 11 and 12, are suitably clamped together, leaving the several rectangular and vertically arranged channels 13 that extend throughout the height of the head 5, leaving the several openings 8 in full communication with adjacent channels. It will be clearly apparent that the rods bisect each of the channels and extend forwardly or outwardly of each of the end or cover plates 12.

Now, with the several plates and separators securely clamped together and suitably supported upon a flat surface, molten metal, such as lead, is poured into the several channels until they are completely filled, with the lead flowing freely through the openings 8 and forming in effect a continuous and relatively wide core 14 throughout the length of the head, with the several plates 6 being securely interlocked in the core. The core 14, as clearly shown, extends outwardly of the end plates 6, a distance equal to the spacing of the plates 6 and securely interlocks the end plates 6 against displacement. When the lead has hardened, the several blocks and cover plates 10, 11 and 12 are removed, after which the aligning and supporting rods 9 are forced outwardly, leaving a pair of cylindrical openings throughout the length of the head 5, shown clearly in Figure 3. The cylindrical openings, indicated in their entirety by the numeral 15, receive cylindrical mounting and supporting rods, not shown, whereby the head is suitably supported upon a carriage or other conveyor mechanism embodied in the grinding machine.

As before stated, the openings 7 and 8 are arranged to one side of the vertical center line of the plates 6 and the purpose of such arrangement is to position the core 14 in a like manner, thus providing a leading side (A) and a trailing side (B) for the head. The leading side provides a plurality of relatively deep sockets that are open at their top and bottom and forward side, and with the trailing side provided with a corresponding number of relatively shallow and open sockets. The core 14 defines the rear end of each socket and by the use of lead or similar material, provides an abutment that is relatively soft.

The device in use is arranged in supported position upon the carriage conveyor of the machine and the glass to be ground is arranged between the several plates 6, shown at 16 by dotted lines in Figure 4. The propulsion head is adapted to travel through the machine in the direction of the arrow in Figure 4 and serves to propel the several sheets of glass in edgewise manner for simultaneous grinding engagement with the grinding wheels, indicated at 17, by dotted lines in Figure 4. With the rear ends of the sheets of glass supported within the sockets of the leading side (A), it becomes also necessary that means be provided to support the forward ends of the glass 16, since they are propelled in a forward manner and must be maintained in a true course to properly engage the grinding wheels. To provide for this contingency, the heads 5 are connected with the conveyor at points close enough together so that the forward ends of the glass sheets 16 will be disposed in the sockets of the trailing side of the head 5, the depth of engagement being just sufficient to prevent the glass from tilting or otherwise shifting. The engagement of the forward ends of the glass in the sockets of the trailing side (B) is indicated by dotted lines in Figure 4. Thus, the sheets of glass are accurately supported in edgewise manner throughout their travel through the machine. The open sockets obviously will accommodate glass sheets having varying transverse widths and with the glass being floating as regards the propulsion heads. The lead core provides a relatively soft abutment which will prevent the tendency toward chipping the ends of the glass.

It will thus be apparent that the propulsion heads are formed by a method which is extremely simple and cheap to manufacture and provides a highly effective propulsion head that is applicable to various forms of grinding machines. Heads heretofore have been costly, since they embody expensive castings and expensive assemblies and connecting means to the conveyor systems of the machines. The device of this invention requires no expensive molds or machining and results in a very considerable saving in cost of equipment and operation of the relatively costly grinding machines now in use.

Variations in the method of assembly of the device is contemplated as readily falls within the spirit of the invention or the scope of the subjoined claims.

Having described my invention, what I claim as new and desire to secure by Letters Patent is:

1. A propulsion head assembly comprising a multiplicity of guide plates spaced apart a distance substantially equal to the thickness of glass plates, the edges of which are to be ground, and with the edges of the guide plates aligned with each other and a core which ties all of said plates together, said core comprising filler members lying between and spacing said guide plates apart and integral tie members extending from filler member to filler member and through the guide plates, the filler members terminating enough short of the outer ends of the guide plates to leave open spaces between the guide plates for the reception of the ends of the glass plates to be ground.

2. The device according to claim 1, wherein the core extends for the full height of the plates to be flush with the top and bottom edges of the plates and with the core being disposed to one side of the vertical center line of the plates.

3. The device according to claim 1, wherein each of the plates are provided with transverse apertures adjacent their top edges, the said core extending through the apertures to form a continuous integral tie for the several plates throughout the entire length of the head and with the core extending outwardly of the outermost plates.

4. The device according to claim 1, wherein the plates are provided with relatively large transverse cylindrical apertures that are spaced apart vertically of the plates and with the cylindrical apertures of all the plates being in axial alignment, the core being apertured throughout its length in axial alignment with and of identical diameter with the cylindrical apertures of the plates.

5. The device according to claim 1, wherein the plates are formed of non-metallic substance and the core is formed of a soft metal.

References Cited in the file of this patent

UNITED STATES PATENTS

| | | |
|---|---|---|
| 1,571,985 | Weber | Feb. 9, 1926 |
| 1,906,329 | Mermer | May 2, 1933 |
| 1,955,981 | Smith | Apr. 24, 1934 |
| 2,154,749 | Hines | Apr. 18, 1939 |
| 2,160,085 | Robertson | May 30, 1939 |
| 2,531,640 | Oberstar | Nov. 28, 1950 |